UNITED STATES PATENT OFFICE.

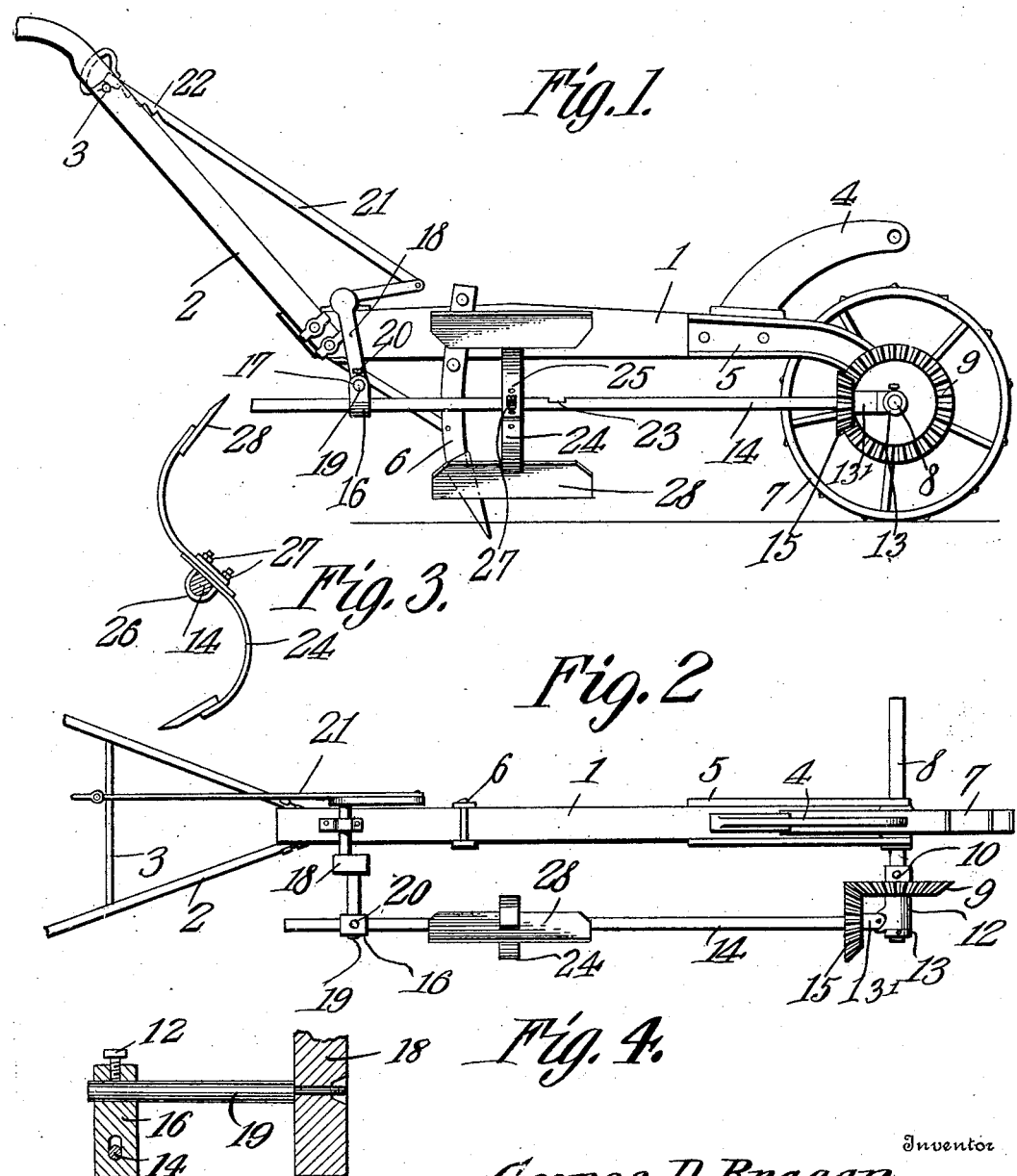

GEORGE DURWOOD BRAGAN, OF NEWTON, ALABAMA.

COTTON-CHOPPER.

No. 928,932.  Specification of Letters Patent.  Patented July 27, 1909.

Application filed October 23, 1908. Serial No. 459,204.

*To all whom it may concern:*

Be it known that I, GEORGE DURWOOD BRAGAN, a citizen of the United States, residing at Newton, in the county of Dale and State of Alabama, have invented a new and useful Cotton-Chopper, of which the following is a specification.

This invention has relation to cotton choppers, and it consists in the novel construction and arrangement of its parts as hereinafter shown and described.

The object of the present invention is to provide an implement of the character described in which an operator, the beam of the implement and the driving or supporting wheel thereof, together with the draft animal, may move along the side of a row of plants substantially in alinement while the cutting operation occurs at the side of the beam and transversely across the row of plants. Thus an implement is provided which may be easily and readily handled without damaging those plants left standing in the row.

A further object of the invention is to provide an implement of the character indicated in which the chopping blades or hoes may be adjusted vertically while the implement is in operation. Also for providing means whereby the said hoes may be caused to operate close to the beam or at a distance therefrom.

A further object of the invention is to provide means whereby the said hoes may be adjusted longitudinally along a supporting shaft and transversely with relation to the same.

The parts of the implement are so constructed that the chopping or cutting hoes may be positioned as to operate at either side of the implement, as desired.

In the accompanying drawings:—Figure 1 is a side elevation of the cotton chopper. Fig. 2 is a top plan view of the same. Fig. 3 is a transverse sectional view of a shaft used in the chopper, showing the blades located thereon. Fig. 4 is a detail sectional view of a portion of the chopper.

The chopper consists of the beam 1 to the rear end of which is attached the handles 2, which are connected together at their upper end portions by means of the round 3. The clevis support 4 is mounted upon the forward end of the beam 1, and the arms 5 are attached to the sides of the forward end portion of the said beam. The standard 6 depends from the said beam 1 and is adapted to carry a plow-point at its lower end portion. The drive or supporting wheel 7 is mounted upon the axle shaft 8, which is journaled in the forward ends of the arms 5; the wheel 7 being located between the said arms. The beveled gear wheel 9 is fixed to one end portion of the shaft 8 and may be adjusted longitudinally along the same and secured in an adjusted position by means of the set screw 10 which passes through the hub of the said gear wheel 9 and bears at its inner end against the side of the said shaft 8.

The bearing-box 12 is journaled upon the axle shaft 8 and is held against lateral movement thereon by the beveled gear wheel upon one side and the ring 13 upon the other side, which ring is adjustably fixed to the said shaft 8 by a set screw, similar to that above described. The bearing-box 13' is pivotally connected with the box 12, and may swing laterally with relation to the same. The forward end of the shaft 14 is journaled for rotation in the box 13' and the beveled pinion 15 is mounted upon the shaft 14 and meshes with the beveled gear wheel 9. The bearing 16 is slidably mounted upon the rear end portion of the shaft 14, and the said shaft 14 is journaled for rotation in the said bearing 16. The bearing 16 is provided upon its upper side with a sleeve 17, which is transversely disposed with relation to the socket which receives the shaft 14. The bell-crank lever 18 is fulcrumed upon the beam 1 and is provided at one end with a crank extremity 19 which passes through the sleeve 17 and is adjustably secured therein by means of a set screw 20, carried by the said sleeve. By such an arrangement it is obvious that means is provided for adjusting the bearing 16 along the crank extremity 19 of the lever 18, and for securing the said bearing 16 in adjusted position upon the said crank extremity. The forward end of the rod 21 is pivotally connected with the opposite end of the bell crank lever 18 from that end carrying the extremity 19, and the said rod is provided, upon its upper edge, and in the vicinity of its upper end, with the notches 22, any one of which is adapted to receive the round 3 secured to the upper portions of the handles 2.

The shaft 14 is provided, at suitable intervals, with the notches 23. The inner ends of the hoe arms 24 overlap each other, and each said arm is provided with a series of perforations 25, the perforations of one arm being adapted to register with the perforations of the other arm, and said registering perforations receiving a U-bolt 26, which straddles the shaft 14, and which is held in position, and clamps the inner portions of the arms 24 together by means of the nuts 27, screw-threaded upon the ends thereof. The holes or blades 28 are carried by the outer ends of the arms 24.

By such an arrangement it will be seen that the hoe arms 24 may be positioned at desired points along the shaft 14, and that the said hoe arms may be moved longitudinally with relation to each other and secured in adjusted positions, whereby the space between the hoes and the outer ends of said arms may be regulated. It will also be seen that when the rod 21 is pulled the bell-crank lever 18 will be rocked upon its fulcrum, and thus the rear end portion of the shaft 14 may be raised or lowered, as desired, and during such raising or lowering movement the bearing 16 may move longitudinally along the said shaft 14. As the rear end of the shaft 14 is raised or lowered as described, the shaft will swing in an arc upon the axis of the axle shaft 8 as its center, and at the same time the bearing 16 swings in an arc upon the axis of the bell crank lever 18 as a center; thus provision must be made for permitting the bearing 18 to swing in its arc while the shaft 14 swings in its arc, and remains radially disposed with relation to the axle shaft 8. To accomplish this, the opening in the bearing 16 which receives the shaft 14 may be sufficiently large to permit such relative movement of the parts 16 and 14; or the extremity 19 of the bell crank lever 18 may be journaled to said lever. The standard 6 is located substantially opposite the hoe blades 28, and consequently the plow carried by the lower end of the said standard will steady the instrument against the cutting or chopping operation of the said hoes. It will be seen that by adjusting the bearing 16 along the crank extremity 19 of the lever 18, and by adjusting the parts mounted upon the end portion of the axle shaft 8, that the said hoe blades 28 may be caused to operate upon the standing plants at a greater or less distance laterally from the beam 1. By reason of the fact that the bearing box 12 is pivotally connected with the box 13', the rear end portion of the said box 13' may be swung laterally, in order that the beveled pinion 15 may be removed and a larger or smaller pinion placed upon the shaft 14 in its stead. Thus means is provided for causing the said shaft to rotate at relatively fast or slow rates of speed. It will also be seen that the parts are so constructed that they may be readily removed from one side of the implement and assembled in proper position with relation to each other upon the opposite side of the implement, whereby the implement may be used to perform the chopping operation at the right or left hand side as desired. In either event, it will be observed that the beam and the handles, and the draft means, together with the supporting or driving wheel, are located substantially in a common plane, or in alinement, and that the chopping operation occurs at the side of the beam. Thus the draft animal may move between the rows, as can also the operator, while the body of the implement will move similarly, and the chopping hoes or blades are the only parts of the implement which will operate above or transversely across the row of standing plants.

Having described my invention, what I claim as new, and desire to secure, by Letters Patent, is:—

A cotton chopper comprising a beam, an axle shaft journaled thereto, a supporting wheel mounted upon the axle shaft, a beveled gear wheel mounted upon the axle shaft, a bearing box mounted upon the axle shaft, a collar adjustably mounted upon said axle shaft and being located against the opposite side of the bearing box from the said beveled gear wheel, a second bearing box pivotally connected with the first said bearing box, a shaft journaled at one end in the last said bearing box, a beveled pinion mounted upon the shaft and meshing with the said gear wheel, chopping blades carried by the shaft, and means mounted upon the beam for raising and lowering the end portion of the shaft with relation to the beam.

In testimony that I claim the foregoing as my own, I have hereto affixed my signature in the presence of two witnesses.

GEORGE DURWOOD BRAGAN.

Witnesses:
 JOHN F. HELMS,
 WILLIAM H. MULLIN.